March 7, 1950 S. MANDL ET AL 2,499,962
PORTABLE IMPACT TOOL ASSEMBLAGE
Filed July 21, 1945 2 Sheets-Sheet 1
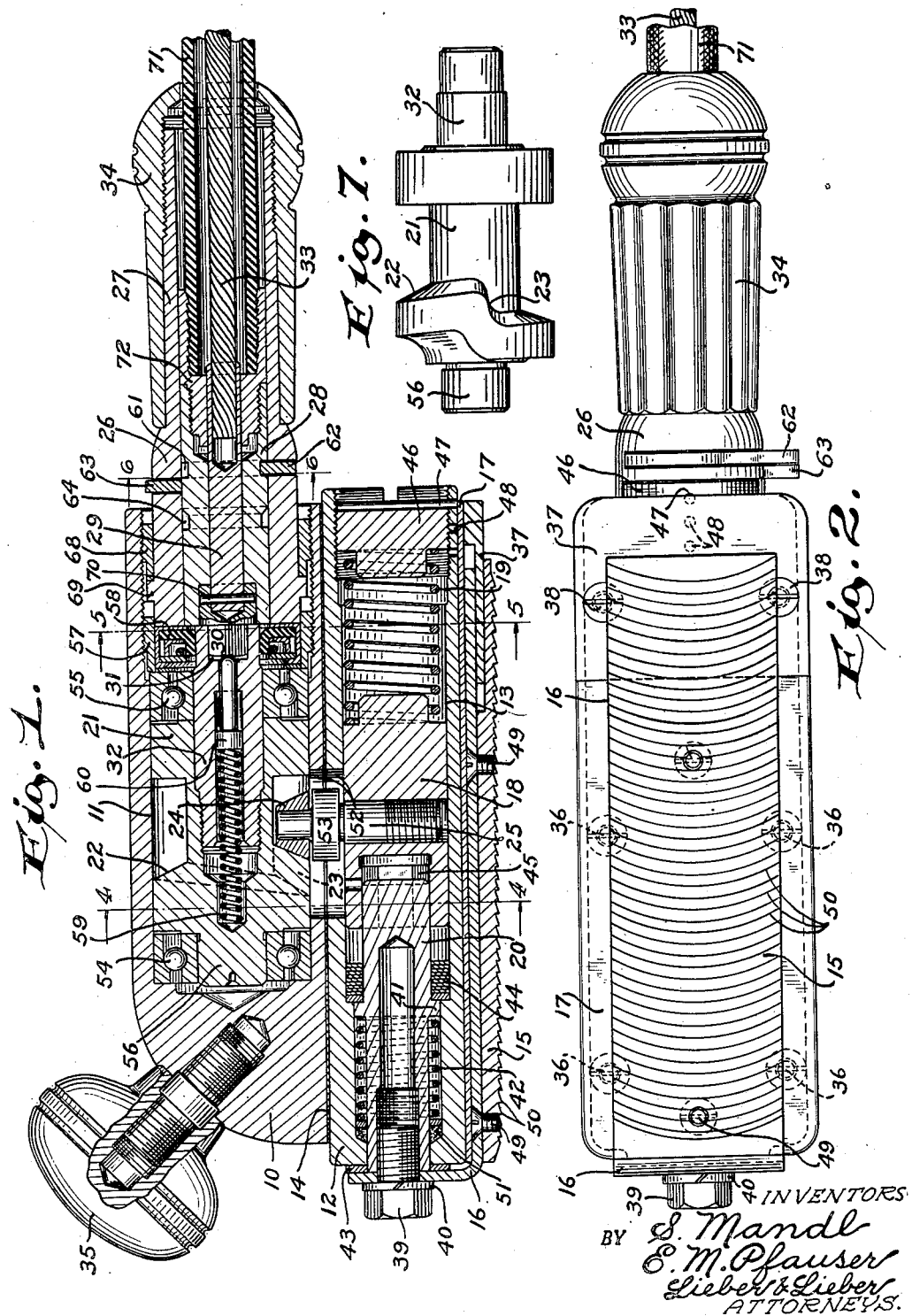
INVENTORS
BY S. Mandl
E. M. Pfauser
Lieber & Lieber
ATTORNEYS.

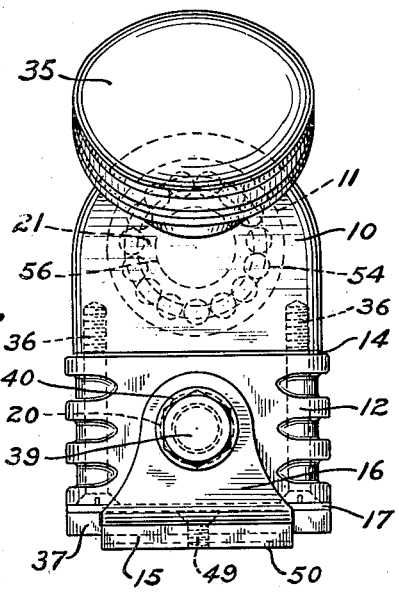

Patented Mar. 7, 1950

2,499,962

UNITED STATES PATENT OFFICE 2,499,962

PORTABLE IMPACT TOOL ASSEMBLAGE

Siegmund Mandl, Milwaukee, and Edward M. Pfauser, Elm Grove, Wis., assignors to Blackhawk Mfg. Co., Milwaukee, Wis., a corporation of Wisconsin Application July 21, 1945, Serial No. 606,442

3 Claims. (Cl. 29—76)

Our invention relates generally to improvements in impact tools, and relates more specifically to improvements in the construction and operation of portable reciprocatory impact tool assemblages for performing various classes of work, and especially adapted to dress soft metals.

The primary object of the present invention is to provide a new and useful portable impact tool assemblage which is simple and compact in construction and highly efficient in operation.

Considerable difficulty has heretofore been encountered when attempting to use rasps or other well known types of files for the purpose of filing soft metals such as lead, babbitt, zinc, or the like, because of the fact that the removed particles of material would lodge in the teeth of the reciprocatory tool and would thus cause the file to merely slide over the work without functioning to remove subsequent metallic particles. While this objectionable action resulted to some extent both when manipulating the files rather slowly by hand, and when utilizing more rapid power actuation, it was far more pronounced when operating the rasps at high speed and with uniform reciprocations or strokes in both directions, and in such cases the teeth would clog after but a few reciprocations and the tools would become useless without frequent stopping and cleaning. We have discovered that this annoyance may be entirely and effectively eliminated by properly constructing the teeth of the rasp or file in the form of a series of chisel edges, and by applying a rapid succession of reciprocatory impacts rather than uniform reciprocations, to the toothed tool, whereby each chisel tooth edge will quickly shave particles of material from the work during the rapid forward stroke thereof but will shed the removed material from its cutting edge during the slower return stroke of the tooth. We have also found that in order to successfully apply this principle of operation to a portable file, the relatively light tool must be suspended from a comparatively heavy body or support, in order to insure most effective work performance.

It is therefore a more specific object of our present invention to provide an improved reciprocatory rasp or toothed implement, and an improved carrier for actuating the same, whereby the assemblage may be utilized to effectively perform most difficult classes of work.

Another specific object of this invention is to provide an improved portable impact tool and support especially adapted for use in dressing or filing soft metals such as lead, babbitt, zinc, copper, brass, or the like, and which may be operated for prolonged periods of time without necessity of cleaning or sharpening the teeth or cutting edges of the implement.

A further specific object of the invention is to provide an improved portable mechanism for applying a rapid succession of reciprocatory impacts to various types of files or other impact tools, in a most efficient manner and without permitting the tool to be pushed back by the fixed work during each impact stroke.

Still another specific object of our invention is to provide a simple, compact, and durable power operated portable impact tool assemblage, which is flexible in its adaptations and which is also adapted to be freely manipulated in any desired direction and in corners and other relatively inaccessible localities.

An additional specific object of the present invention is to provide an improved portable impact unit, all parts of which are normally amply lubricated and protected while still being conveniently accessible and removable, and which may be manufactured at moderate cost and utilized for diverse purposes.

These and other specific objects and advantages of the invention will be apparent from the following detailed description, and some of the improved features of portable tool actuating unit construction shown but not specifically claimed herein, form the subject of co-pending applications.

A clear conception of the several features constituting our present invention, together with the mode of constructing and of manipulating our improved tools and driving units, may be had by referring to the drawings accompanying and forming a part of this specification wherein like reference characters designate the same or similar parts in the various views.

Fig. 1 is a longitudinal central section through one of our improved portable impact tool assemblages including a rasp and mechanism for driving the same;

Fig. 2 is a bottom view of the improved assemblage of Fig. 1, with the front manipulating knob omitted;

Fig. 3 is a front end view of the improved impact tool assemblage;

Fig. 4 is a transverse section through the improved assemblage, taken along the line 4—4 of Fig. 1;

Fig. 5 is another transverse section through the same assemblage, taken along the line 5—5 of Fig. 1;

Fig. 6 is still another transverse section through the assemblage, taken along the line 6—6 of Fig. 1; and Fig. 7 is a side elevation of the rotary driven member of the improved assemblage.

While the invention has been shown and described herein as being advantageously applicable to a portable impact tool assemblage comprising an improved rasp or file and mechanism operable from a remote source of power for converting rotary motion into reciprocatory impact movement and for delivering the latter to the improved tool, it is not our desire to unnecessarily limit the improvement by virtue of this specific embodiment, as some of the improved features are obviously more generally applicable to impact tools and operating mechanisms therefor driven by various types of motors disposed either remotely from or mounted directly upon the portable unit. It is also intended that various specific terms employed herein in order to clearly define the structure, be given the broadest possible meaning and interpretation consistent with the prior art.

Referring to the drawings, the improved portable impact tool and operating assemblage shown therein by way of illustration, comprises in general, an upper elongated casing or body 10 having a central bore 11; a lower similarly elongated casing or base 12 also having a central bore 13 and coacting through an intervening sealing gasket 14 with the lower flat surface of the body 10; an elongated special file or rasp 15 carried by an L-shaped sled or bracket 16 which has sliding coaction with a plane bearing plate 17 secured to the lower flat surface of the base 12; a hammer or impact element 18 slidably confined within the base bore 13 and cooperating at one end with a stiff impact producing spring 19 and at its opposite end with a plunger 20 secured to the rasp carrying bracket 16; a rotary driven member 21 confined within the body bore 11 and having one or more revolving cam surfaces 22 and drop-off ledges 23 which are cooperable with a tapered roller 24 carried by a lateral projection 25 firmly secured to the element 18 to retract the latter after each impact movement produced by the spring 19; a hollow plug 26 normally rigidly confined within the open end of the body bore 11 and having an integral tubular rear extension 27; a sleeve 28 slidably and rotatably confined within the plug 26; a rotary driving member 29 journalled for rotation within the sleeve 28 in axial alinement with the driven member 21 and having a polygonal end projection 30 which is cooperable with a star-shaped socket 31 formed in tubular element 32 carried by the member 21 to establish a rotary driving connection between the members 29, 21; a flexible drive shaft 33 for the driving member 29 adapted to be constantly rotated from any suitable source of power; a rear manipulating handle 34 embracing the tubular plug extension 27 and the power delivery end of the shaft 33; and a front manipulating handle or knob 35 secured to the upper forward end of the casing body 10.

The upper casing or body 10 and the lower casing or base 12 are firmly but detachably united by screws 36 which also clamp the gasket 14 in place, and these united casings 10, 12 should be relatively heavy in order to provide a portable body the inertia of which will effectively resist rearward thrust induced by the comparatively light file 15 or other tool, during each impact stroke. The L-shaped tool carrying sled or bracket 16 which slidably engages the lower bearing plate 17, coacts with a rear end guide 37 secured to the casings 10, 11 by means of longer screws 38, and these screws 38 also serve to hold the plate 17 in proper position and to additionally firmly but detachably unite the main casing sections. The front leg of the sled bracket 16 is secured to the outer extremity of the plunger 20 by a cap screw 39 and lock washer 40; and the medial portion of this plunger 20 is provided with a flange 41 which is slidable within a reduced portion of the bore 13. The forward portion of the plunger 20 is embraced by a relatively light compression spring 42 which coacts with the base 12 and with the flange 41 to constantly urge the sled 16 rearwardly, and the front leg of the sled bracket 16 is cooperable with a stop washer 43 so as to limit the return stroke of the sled and rasp 15. The rear portion of the plunger 20 is embraced by a resilient buffer 44 and is of polygonal cross-section as shown in Figs. 1 and 4; and the front end of the impact hammer or element 18 has therein a polygonal socket 45, which slidably engages the rear end portion of the plunger 20 and prevents relative rotation of the hammer and plunger. The stiff impact producing spring 19 which engages the rear end of the hammer 18, reacts against an adjustable plug 46 which is screw threaded within the bore 13 of the casing base 12, and is adapted to be locked in various positions of adjustment by a pin 47 coacting with any of a series of holes 48 formed in the casing section 12.

While various types of reciprocatory impact tools may be applied to the sled or bracket 16, we have found that the improved rasp 15 is especially advantageous when utilized to file soft metals. This rasp 15 which is relatively light as compared to its portable suspension body, is firmly secured to the lower elongated leg of the sled bracket 16 by fusion of metal as by welding or brazing and with the additional aid of rivets or screws 49; and is provided with a series of transversely curved chisel teeth 50 as clearly indicated in Figs. 1 and 2. The curvature of the teeth 50 is preferably convex in the direction of the impact blows, that is, the mid-portions of the teeth are farthest advanced in the direction of travel of the rasp 15 during its forward or cutting stroke, so that particles of material which are chiselled from the work during the successive impact strokes are discharged laterally away from the opposite sides of the cutting zone and will not accumulate therein. Each tooth 50 is formed with an arcuate front face disposed approximately perpendicular to the plane of the rasp 15, while the rear faces of the teeth are inclined rearwardly and upwardly toward this plane, thus avoiding undercut pockets or ledges within which chips or particles might tend to lodge, while still providing sharp cutting edges or successive chisels. As previously indicated, this improved rasp 15 has proven highly satisfactory and effective in actual use on soft metals such as lead, zinc, babbitt, brass, aluminum, and the like, when operating at speeds as high as three thousand impacts per minute.

The impact buffer 44 is preferably formed of soft rubber or rubber and canvas disks which also serve as seals, and the plunger 20 is additionally embraced by a packing 51 with which the spring 42 coacts so as to aid the gasket 14 in sealing the bore 13 within which the hammer 18 is confined. The bores 11, 13 of the two casings 10, 12 communicate with each other through alined slots 52 along which the enlarged medial portion 53 of the motion transmitting projection 25 is slidable in order to maintain the tapered roller 24 in proper coaction with the cam surfaces 22 of the driven member 21 at all times, and to also assist the polygonal socket 45 in preventing possible rotation of the hammer element 18. While the enlarged medial portion of the rotary driven member 21 which is confined within the upper casing bore 11, is shown in Figs. 1 and 7 as having only one helical or cam surface 22 and drop-off surface 23, formed thereon, whereby only a single impact movement is produced during each revolution of the member 21, this single surface 22 may obviously be replaced by a member 21 having several successive cam surfaces 22 and drop-off ledges interconnecting the adjacent ends of the successive cams, in order to produce a number of impacts during each revolution of the driven member. The rotary driven member 21 which should be dynamically balanced, is journalled for free rotation in front and rear anti-friction thrust-resisting bearings 54, 55 respectively, confined within the bore 11 and coacting with a reduced end portion 56 of the member 21 and with the tubular socketed element 32, and these bearings are formed to prevent axial displacement of the member 21. The front bearing 54 coacts with the inner end of the bore 11, while the rear bearing 55 is engaged by a bushing 57 which is screw threaded within the outer end portion of the bore 11, and a packing assemblage 58 coacts with the bushing 57, bearing 55, and element 32, and cooperates with the gasket 14, buffer 44, and packing 51 to confine lubricant within the casing bores 11, 13.

The interior of the rotary driven member 21 and the central bore of the tubular element 32, are provided with a compression spring 59 and a plunger 60 disposed in axial alinement with the rotary driving member 29, and this spring and plunger tend to constantly interrupt the driving connection afforded by the projection 30 and socket 31, as indicated in Fig. 1. In order to avoid such interruption of this driving connection when the tool is being operated, the bearing sleeve 28 in which the rotary driving member 29 is journalled, is provided with an annular groove 61 with which a latch 62 is cooperable as illustrated in Figs. 1 and 6. Another latch 63 is cooperable with a second annular groove 64 also formed in the sleeve 28, when the latch 62 has been released and the spring 59 and plunger 60 have acted to push the driving projection 30 out of the driven socket 31; and these latches 62, 63 are swingably suspended from the casing plug 26 by pivot pins 65 and are resiliently urged toward latching position, by springs 66 and plungers 67, as shown in Fig. 6. When the latch 62 is active, the projection 30 is positively held within the socket 31 and the direct rotary driving connection is maintained while the other latch 63 is inactive, but if the latch 62 is released, the spring 59 and plunger 60 immediately force the projection 30 out of the socket 31 to interrupt the driving connection, and the latch 63 then engages the groove 64 so as to prevent the bearing sleeve 28 from being pushed out of the casing plug 26. The driving connection may however be quickly re-established by merely pushing the sleeve 28 inwardly, and the plug 26 is at all times freely rotatable about the sleeve 28 and may be readily withdrawn from this sleeve by merely releasing both latches 62, 63. The plug 26 may be firmly but detachably secured to the casing body 10 by means of a second bushing 68 coacting with the internal screw threads of the casing bore 11 and with a peripheral flange 69 of the plug, and both bushings 57, 68 are provided with end notches adapted for reception of a spanner wrench.

The driving projection 30 may either be formed integral with the rotary driving member 29, or secured thereto by means of a shear pin 70, and as previously indicated, the member 29 is adapted to be constantly rotated by a flexible shaft 33 operable from any suitable source of power such as an electric or fluid pressure operated rotary motor. The power delivery end of the shaft 33 may be firmly secured to the driving member 29, by fusion of metal or otherwise, and is housed within a flexible non-rotating conduit 71 the end of which is rigidly attached to a fitting 72 screw threaded to the bearing sleeve 28. The fitting 72 and the adjacent end of the flexible conduit 71 may be confined within the integral tubular rear extension 27 of the plug 26 to which the rear manipulating handle 34 is also attached, thus protecting the operator against contact with power driven parts; and the rear handle 34 is preferably disposed in axial alinement with the body 10 while the front manipulating knob is preferably disposed at an angle as shown, in order to facilitate manipulation of the unit in a manner similar to an ordinary hand file.

When it becomes desirable to utilize the improved power driven portable unit and rasp 15, the upper and lower casing sections 10, 12 should first be properly assembled as shown, and the bores 11, 13 should be supplied with abundant and suitable lubricant. The driven member 21, roller 24, impact element 18, plunger 20 and the anti-friction bearings 54, 55 will then be confined in the lubricant and positively protected against entry of dust and grit by the gasket 14, packing 51, and sealing assemblage 58. The rasp 15 should be firmly attached to the sled bracket 16 with the aid of rivets or screws 49, and by fusion of metals, and this sled should be caused to slidably coact with the bearing plate 17 and guide 37, and should be firmly attached to the outer end of the plunger 20 with the aid of the cap screw 39 and lock washer 40. After the tension of the spring 19 has been properly adjusted with the aid of the plug 46 and pin 47, the assembled portable unit may be applied to the bearing sleeve 28 with the aid of the latch 63 coacting with the groove 64, and the flexible drive shaft 33 should be constantly rotated at any desired speed and from any suitable source of power located either remotely from the portable unit or carried directly thereby.

During normal operation and use of the power driven unit, the operator will ordinarily grasp the handle 34 and knob 35, and he may provide a driving connection between the projection 30 of the driving member 29 and the socket 31 of the driven member 21, by merely pushing the sleeve 28 inwardly with the aid of the conduit 71 until the latch 62 snaps into the annular groove 61, but without manually pressing either latch 62, 63. Rotary motion from the driving member 29 will then be imparted directly to the driven member 21 thereby causing the cam and ledge surfaces 22, 23 of this member to revolve about the common axis of the members 21, 29, and producing a succession of rapid retractions of the roller 24, projection 25 and impact element 18. During each of these retractions of the hammer element 18, the stiff spring 19 which coacts with the hammer and reacts against the relatively heavy casing body, is compressed and the other lighter spring 42 which coacts with the lighter plunger 20 expands, thereby retracting the comparatively light sled 16 and rasp 15, and producing a relatively slow rearward stroke of the file. However, whenever the roller 24 passes one of the ledge surfaces 23 after each retraction, the stiff spring 19 immediately becomes effective to impart a rapid forward or impact movement to the hammer 18 which in turn delivers each impact to the rasp 15 and sled 16 through the plunger 20, thereby producing a rapid succession of forward or impact strokes of the chisel teeth 50. While each impact stroke of the tool is slightly cushioned by the relatively light spring 42 coacting with the motion transmitting plunger 20, about one-fifth of each impact motion of the hammer 18 is finally absorbed so as to prevent annoying vibration, by the resilient buffer 44 whenever each impact is completed; and the inertia of the relatively heavy casings 10, 12 effectively prevents the portable assemblage from being pushed rearwardly by the lighter rasp 15 and sled 16 during the chiseling or impact strokes.

The rasp 15 is thus subjected to a rapid succession of impact and return strokes whenever the driven member 21 is being revolved by the driving member 29, and the operator need only hold the assemblage in contact with the work without undue effort. The chisel teeth 50 remove particles of material from the work during each impact stroke, while the inertia of the heavier body assemblage augments the chiseling action, and the removed particles are ejected from the working zone by the arcuate formation of the teeth 50. The operator may move the portable unit freely over the surfaces of the work in any desired direction and at any suitable rate of speed, and when it becomes desirable to disconnect the power, it is only necessary to press the latch 62 whereupon the spring 59 and the plunger 60 will immediately become effective to interrupt the driving connection by forcing the projection 30 out of the socket 31, until the other latch 63 enters the annular recess 64. This entry of the latch 63 into the recess 64 will prevent the bearing sleeve 28 from being forced out of the bore of the plug 26, but if it becomes desirable to remove the portable impact unit from the bearing sleeve 28, both latches 62, 63 may be released whereupon the sleeve 28 and the driving member 29 may be freely withdrawn from within the plug 26 and its extension 27. When the sleeve 28 has been thus removed from the portable unit, the packing assemblage 58 will function to maintain a seal for preventing escape of lubricant from within the bores 11, 13, and if it becomes desirable to remove the plug 26 and other normally concealed parts of the unit, it is only necessary to remove the bushings 57, 68 with the aid of a spanner wrench, whereupon the plug 26, bearings 54, 55 and the rotary driven member 21 may be removed in an obvious manner. The casing sections 10, 12 may be readily removed from each other by merely withdrawing the screws 36, 38, and the interior of the lower casing section 12 is freely accessible upon removal of the end plug 46 and pin 47. The sled 16 may also be readily removed from the lower casing base 12 by merely removing the cap screw 39, thus permitting convenient replacement of the rasp 15 with other reciprocatory impact tools.

From the foregoing detailed description it will be apparent that our present invention provides an improved portable impact unit and an improved tool therefor, which besides being simple, compact and efficient in construction, are readily manipulable in any desired position and in corners and other limited localities. All of the parts of the improved driving mechanism are sturdy in construction and are so formed and operable that they will transmit minimum jarring and vibration to the operator manipulating the unit. The internal movable parts of the assemblage are thoroughly concealed and protected against possible entry of foreign matter, while still being readily accessible for inspection with the aid of ordinary tools, and the improved rasp 15 while being of simple and sturdy construction, is also highly effective in use and is not susceptible of easy clogging.

The improved portable filing unit may be operated either at high or low speeds and has in fact been successfully operated at driving shaft speeds of three thousand revolutions per minute, and the latches 62, 63 cooperate with the projection 30, socket 31, plunger 60 and spring 59 to provide simple but effective means for applying and for interrupting the power. These latches also cooperate with the flexible conduit 71 to permit manipulation of the portable unit in any desired direction, and while the use of a flexible shaft 33 is not absolutely necessary, it will permit cooperation of the portable unit with a stationary motor of any suitable type. This motor while preferably being disposed in a fixed locality, may also be mounted directly upon the portable unit. The unit is obviously extremely flexible in its adaptations and may be operated in the manner of an ordinary file or saw, and the invention has proven highly satisfactory and successful in actual use, for diverse purposes. The unit may also be manufactured and sold at moderate cost and has long life due to the fact that the working parts may be constantly maintained abundantly lubricated.

The specific construction of the file or rasp 15, and of the mechanism for imparting the impacts to this rasp, are important features of the present improvement, since it has heretofore been impossible to operate a rasp on soft metals without undesirable clogging of the teeth. The sled 16 to which the rasp 15 is attached, is thoroughly guided during its reciprocation, and the plunger 20 cooperating with the hexagonal socket 45 of the hammer 18 provides efficient means for delivering the impact or forward motions to the rasp 15. The relatively light spring 42 functions to return the plunger 20 and the sled 16 without abnormal shock or vibration, and the heavy spring 19 functions to impart rapid impulses to the hammer 18, while the buffer 44 absorbs the inertia of the hammer 18 at the end of each impact stroke. As previously indicated, the driven member 21 may be formed with one or more cam surfaces 22 and drop-off surfaces 23 so that several impulses may be delivered to the hammer 18 during each revolution of the member 21. The rotating member 21 should also be dynamically balanced in order to eliminate vibration due to unbalanced rotating parts, and in order to avoid subjecting the operator to annoying disturbances. As previously indicated, the provision of a relatively heavy portable supporting body for the comparatively light sled and tool, is an important feature of the present improvement, especially when applied to filing soft metals, and it has been found that satisfactory filing of such metals cannot be accomplished without having the casings 10, 12 and the elements confined therein of sufficient combined weight so that the inertia thereof will prevent the chisel teeth from pushing the casings back whenever an impact is applied to the tool. If such action did occur, the chisels would not be impelled forwardly by the hammer, and there must be a decided and sharp hammer blow delivered to the tool in order to obtain most efficient rasping or cutting. Our improved tool and casing assemblage most effectively accomplishes this desirable result and has actually been utilized to effectively file various soft metals.

It should be understood that it is not desired to limit this invention to the exact details of construction or to the precise mode of use, herein specifically shown and described, for various modifications within the scope of the appended claims may occur to persons skilled in the art.

We claim:

1. A portable abrasive tool assemblage comprising, a casing having therein superimposed parallel upper and lower bores and also having a rectilinear guide near an end of the lower bore and a manipulating handle at the corresponding end of the upper bore, a sled having a carrying plate for abrasive one end of which is slidably cooperable with said guide and the opposite end of which has an integral upstanding flange extending over the opposite end of said lower bore, a plunger slidably confined within said lower bore and being detachably secured to said flange to retain said plate within said guide, a hammer reciprocable within said lower bore and being cooperable with said plunger to impart impacts to said sled, a rotor revolvable within said upper bore and being cooperable with said hammer to impart movement thereto in one direction, means for imparting impact motion to said hammer in the opposite direction, and flexible motion transmitting means extending longitudinally through said handle in alinement with said upper bore for revolving said rotor.

2. A portable abrasive tool assemblage comprising, a casing having superimposed sections each provided with an elongated bore, the lower of said sections having a rectilinear guide near an end of its bore and the upper section having a manipulating handle projecting from the corresponding end of its bore, a sled having a carrying plate for abrasive one end of which is slidably cooperable with said guide and the opposite end of which has a flange extending laterally of the plate over the opposite end of said lower casing bore, a plunger slidably confined within said lower section bore and being detachably secured to said flange to retain said plate within said guide, a hammer reciprocable within said lower casing bore and being cooperable with said plunger to impart impacts to said sled, a rotor revolvable within the upper section bore and being cooperable with said hammer to impart movement thereto in one direction, a flexible motion transmitter extending longitudinally through said handle in alinement with said rotor for revolving the latter, and means within said lower section bore for imparting impact motion to said hammer in the opposite direction.

3. A portable abrasive tool assemblage comprising, a casing having therein superimposed parallel upper and lower bores the upper of which is open at one end only and the lower of which is open at both ends, a rectilinear guide associated with said casing near the end of said lower bore nearest the open end of said upper bore, a sled having a carrying plate for abrasive one end of which is slidably cooperable with said guide and the opposite end of which has a transverse flange extending across the opposite end of said lower bore, a plunger confined within said lower bore and being detachably secured to said flange to retain said plate within said guide, a hammer reciprocable within said lower bore and being cooperable with said plunger to impart impacts to said sled, means within said lower bore for moving said hammer in one direction, a detachable closure for the end of said lower bore remote from said flange for effecting insertion and removal of said plunger and hammer relative to said bore, a rotor within said upper bore for moving said hammer in the opposite direction, and a detachable closure for the open end of said upper bore for effecting insertion and removal of said rotor relative to said bore.

SIEGMUND MANDL.
EDWARD M. PFAUSER.

REFERENCES CITED

The following references are of record in the file of this patent:

UNITED STATES PATENTS

| Number | Name | Date |
|---|---|---|
| 741,519 | Mahaffy | Oct. 13, 1903 |
| 807,143 | Vernaz | Dec. 12, 1905 |
| 1,063,076 | Simmons | May 27, 1913 |
| 1,356,297 | Lochner | Oct. 19, 1920 |
| 1,458,439 | Roberts | June 12, 1923 |
| 1,588,832 | Young | June 15, 1926 |
| 1,798,082 | Grutzbach | Mar. 24, 1931 |
| 2,120,300 | Taylor | June 14, 1938 |
| 2,123,426 | Kehle | July 12, 1938 |
| 2,197,626 | Von Scheven | Apr. 16, 1940 |
| 2,307,431 | Tilden et al. | Jan. 5, 1943 |

FOREIGN PATENTS

| Number | Country | Date |
|---|---|---|
| 5,859 | Great Britain | Mar. 8, 1911 |